(12) United States Patent
Weber

(10) Patent No.: US 9,396,629 B1
(45) Date of Patent: Jul. 19, 2016

(54) HAPTIC MODULES WITH INDEPENDENTLY CONTROLLABLE VERTICAL AND HORIZONTAL MASS MOVEMENTS

(71) Applicant: Apple Inc., Cupertino, CA (US)

(72) Inventor: Douglas Weber, Arcadia, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/186,888

(22) Filed: Feb. 21, 2014

(51) Int. Cl.
  *H04B 3/36* (2006.01)
  *G08B 6/00* (2006.01)
  *G06F 3/01* (2006.01)

(52) U.S. Cl.
  CPC *G08B 6/00* (2013.01); *G06F 3/016* (2013.01); *G03B 2205/0076* (2013.01)

(58) Field of Classification Search
  CPC ... G08B 6/00; G03B 2205/0076; G06F 3/016
  USPC .......................... 340/407.1; 345/156; 310/321
  See application file for complete search history.

(56) References Cited

U.S. PATENT DOCUMENTS

| | | | |
|---|---|---|---|
| 5,293,161 | A | 3/1994 | MacDonald et al. |
| 5,434,549 | A | 7/1995 | Hirabayashi et al. |
| 5,436,622 | A | 7/1995 | Gutman et al. |
| 5,739,759 | A | 4/1998 | Nakazawa et al. |
| 6,342,880 | B2 | 1/2002 | Rosenberg et al. |
| 6,373,465 | B2 | 4/2002 | Jolly et al. |
| 6,438,393 | B1 | 8/2002 | Surronen |
| 6,493,612 | B1 | 12/2002 | Bisset et al. |
| 6,693,622 | B1 | 2/2004 | Shahoian et al. |
| 6,822,635 | B2 | 11/2004 | Shahoian |
| 6,864,877 | B2 | 3/2005 | Braun et al. |
| 6,952,203 | B2 | 10/2005 | Banerjee et al. |
| 6,988,414 | B2 | 1/2006 | Ruhrig et al. |
| 7,068,168 | B2 | 6/2006 | Girshovich et al. |

(Continued)

FOREIGN PATENT DOCUMENTS

| | | |
|---|---|---|
| CN | 101036105 | 9/2007 |
| CN | 101409164 | 4/2009 |
| CN | 101663104 | 3/2010 |
| CN | 101872257 | 10/2010 |
| EP | 1686776 | 8/2006 |
| JP | 2004129120 | 4/2004 |
| JP | 2004236202 | 8/2004 |

(Continued)

OTHER PUBLICATIONS

Nasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

(Continued)

*Primary Examiner* — John A Tweel, Jr.
(74) *Attorney, Agent, or Firm* — Brownstein Hyatt Farber Schreck, LLP

(57) ABSTRACT

Electronic devices and methods for creating various haptic effects. In one example, an electronic device may include a first haptic module for creating a first haptic effect, the first haptic module having a first weight member that selectively moves in a substantially vertical orientation relative to the first haptic module; a second haptic module for creating a second haptic effect, the second haptic module having a second weight member that selectively moves in a substantially horizontal orientation relative to the second haptic module; and a processor for controlling the first and second haptic modules. In one example, the processor selectively activates either the first haptic module or the second haptic module based on one or more events or conditions, such as the current orientation or position of the electronic device.

22 Claims, 6 Drawing Sheets

(56) References Cited

U.S. PATENT DOCUMENTS

| | | | |
|---|---|---|---|
| 7,080,271 B2 | 7/2006 | Kardach et al. | |
| 7,130,664 B1 | 10/2006 | Williams | |
| 7,234,379 B2 | 6/2007 | Claesson et al. | |
| 7,253,350 B2 | 8/2007 | Noro et al. | |
| 7,323,959 B2 | 1/2008 | Naka et al. | |
| 7,370,289 B1 | 5/2008 | Ebert et al. | |
| 7,392,066 B2 | 6/2008 | Hapamas | |
| 7,423,631 B2 | 9/2008 | Shahoian et al. | |
| 7,508,382 B2 | 3/2009 | Denoue et al. | |
| 7,570,254 B2 | 8/2009 | Suzuki et al. | |
| 7,656,388 B2 | 2/2010 | Schena et al. | |
| 7,675,414 B2 | 3/2010 | Ray | |
| 7,710,399 B2 | 5/2010 | Bruneau et al. | |
| 7,741,938 B2 | 6/2010 | Kramlich | |
| 7,755,605 B2 * | 7/2010 | Daniel et al. | 345/173 |
| 7,798,982 B2 | 9/2010 | Zets et al. | |
| 7,825,903 B2 | 11/2010 | Anastas et al. | |
| 7,855,657 B2 | 12/2010 | Doemens et al. | |
| 7,890,863 B2 | 2/2011 | Grant et al. | |
| 7,893,922 B2 * | 2/2011 | Klinghult et al. | 345/156 |
| 7,904,210 B2 | 3/2011 | Pfau et al. | |
| 7,919,945 B2 | 4/2011 | Houston et al. | |
| 7,952,261 B2 | 5/2011 | Lipton et al. | |
| 7,952,566 B2 | 5/2011 | Poupyrev et al. | |
| 7,956,770 B2 | 6/2011 | Klinghult et al. | |
| 8,002,089 B2 | 8/2011 | Jasso et al. | |
| 8,040,224 B2 | 10/2011 | Hwang | |
| 8,063,892 B2 | 11/2011 | Shahoian | |
| 8,081,156 B2 | 12/2011 | Ruettiger | |
| 8,125,453 B2 | 2/2012 | Shahoian et al. | |
| 8,154,537 B2 | 4/2012 | Olien et al. | |
| 8,169,402 B2 | 5/2012 | Shahoian et al. | |
| 8,174,495 B2 | 5/2012 | Takashima et al. | |
| 8,217,892 B2 | 7/2012 | Meadors | |
| 8,232,494 B2 | 7/2012 | Purcocks | |
| 8,248,386 B2 | 8/2012 | Harrison | |
| 8,253,686 B2 | 8/2012 | Kyung | |
| 8,262,480 B2 | 9/2012 | Cohen et al. | |
| 8,265,308 B2 | 9/2012 | Gitzinger et al. | |
| 8,344,834 B2 | 1/2013 | Niiyama | |
| 8,345,025 B2 | 1/2013 | Seibert et al. | |
| 8,351,104 B2 * | 1/2013 | Zaifrani et al. | 359/225.1 |
| 8,378,797 B2 | 2/2013 | Pance et al. | |
| 8,378,965 B2 | 2/2013 | Gregorio et al. | |
| 8,384,316 B2 | 2/2013 | Houston et al. | |
| 8,390,218 B2 | 3/2013 | Houston et al. | |
| 8,390,594 B2 | 3/2013 | Modarres et al. | |
| 8,469,806 B2 | 6/2013 | Grant et al. | |
| 8,471,690 B2 | 6/2013 | Hennig et al. | |
| 8,493,177 B2 | 7/2013 | Flaherty et al. | |
| 8,493,189 B2 | 7/2013 | Suzuki | |
| 8,598,750 B2 | 12/2013 | Park | |
| 8,605,141 B2 | 12/2013 | Dialameh et al. | |
| 8,614,431 B2 | 12/2013 | Huppi et al. | |
| 8,619,031 B2 | 12/2013 | Hayward | |
| 8,633,916 B2 | 1/2014 | Bernstein et al. | |
| 8,639,485 B2 | 1/2014 | Connacher et al. | |
| 8,648,829 B2 | 2/2014 | Shahoian et al. | |
| 8,681,130 B2 | 3/2014 | Adhikari | |
| 8,717,151 B2 | 5/2014 | Forutanpour et al. | |
| 8,730,182 B2 | 5/2014 | Modarres et al. | |
| 8,749,495 B2 | 6/2014 | Grant et al. | |
| 8,760,037 B2 * | 6/2014 | Eshed et al. | 310/345 |
| 8,797,153 B2 | 8/2014 | Vanhelle et al. | |
| 8,834,390 B2 | 9/2014 | Couvillon | |
| 8,836,502 B2 | 9/2014 | Culbert et al. | |
| 8,872,448 B2 | 10/2014 | Boldyrev et al. | |
| 8,976,139 B2 | 3/2015 | Koga et al. | |
| 9,086,727 B2 | 7/2015 | Tidemand et al. | |
| 9,134,796 B2 | 9/2015 | Lemmens et al. | |
| 9,172,669 B2 | 10/2015 | Swink et al. | |
| 2005/0036603 A1 | 2/2005 | Hughes | |
| 2005/0230594 A1 | 10/2005 | Sato et al. | |
| 2006/0209037 A1 | 9/2006 | Wang et al. | |
| 2006/0223547 A1 | 10/2006 | Chin et al. | |
| 2006/0252463 A1 | 11/2006 | Liao | |
| 2007/0106457 A1 | 5/2007 | Rosenberg | |
| 2007/0152974 A1 | 7/2007 | Kim et al. | |
| 2008/0062145 A1 | 3/2008 | Shahoian | |
| 2008/0084384 A1 | 4/2008 | Gregorio et al. | |
| 2008/0158149 A1 | 7/2008 | Levin | |
| 2009/0085879 A1 | 4/2009 | Dai et al. | |
| 2009/0115734 A1 | 5/2009 | Fredriksson et al. | |
| 2009/0167702 A1 | 7/2009 | Nurmi | |
| 2009/0174672 A1 | 7/2009 | Schmidt | |
| 2009/0225046 A1 | 9/2009 | Kim et al. | |
| 2009/0231271 A1 | 9/2009 | Heubel et al. | |
| 2009/0243404 A1 * | 10/2009 | Kim et al. | 310/25 |
| 2009/0267892 A1 | 10/2009 | Faubert | |
| 2009/0267920 A1 | 10/2009 | Faubert et al. | |
| 2009/0313542 A1 | 12/2009 | Cruz-Hernandez et al. | |
| 2010/0196001 A1 * | 8/2010 | Ryynanen et al. | 396/493 |
| 2010/0225600 A1 | 9/2010 | Dai et al. | |
| 2010/0267424 A1 | 10/2010 | Kim et al. | |
| 2010/0328229 A1 | 12/2010 | Weber et al. | |
| 2011/0115754 A1 | 5/2011 | Cruz-Hernandez | |
| 2011/0128239 A1 | 6/2011 | Polyakov et al. | |
| 2011/0132114 A1 | 6/2011 | Siotis | |
| 2011/0163946 A1 | 7/2011 | Tartz et al. | |
| 2011/0205038 A1 | 8/2011 | Drouin et al. | |
| 2011/0210834 A1 | 9/2011 | Pasquero et al. | |
| 2011/0210926 A1 | 9/2011 | Pasquero et al. | |
| 2012/0062491 A1 | 3/2012 | Coni et al. | |
| 2012/0127071 A1 | 5/2012 | Jitkoff et al. | |
| 2012/0127088 A1 | 5/2012 | Pance et al. | |
| 2012/0223824 A1 | 9/2012 | Rothkopf | |
| 2012/0232780 A1 * | 9/2012 | Delson et al. | 340/407.1 |
| 2012/0235942 A1 | 9/2012 | Shahoian | |
| 2012/0286943 A1 | 11/2012 | Rothkopf et al. | |
| 2012/0319827 A1 | 12/2012 | Pance et al. | |
| 2013/0002341 A1 | 1/2013 | Maier et al. | |
| 2013/0044049 A1 | 2/2013 | Biggs et al. | |
| 2013/0127755 A1 | 5/2013 | Lynn et al. | |
| 2013/0207793 A1 | 8/2013 | Weaber et al. | |
| 2013/0253818 A1 | 9/2013 | Sanders et al. | |
| 2013/0278401 A1 | 10/2013 | Flaherty et al. | |
| 2014/0002386 A1 | 1/2014 | Rosenberg et al. | |
| 2014/0028573 A1 | 1/2014 | Olien et al. | |
| 2014/0125470 A1 | 5/2014 | Rosenberg | |
| 2014/0218183 A1 | 8/2014 | Van Schyndel et al. | |
| 2014/0218853 A1 | 8/2014 | Pance et al. | |
| 2014/0225831 A1 | 8/2014 | Shinozaki et al. | |
| 2014/0274398 A1 | 9/2014 | Grant | |
| 2014/0282270 A1 | 9/2014 | Slonneger | |
| 2015/0126070 A1 | 5/2015 | Candelore | |
| 2015/0277562 A1 | 10/2015 | Bard et al. | |
| 2015/0338919 A1 | 11/2015 | Weber et al. | |
| 2016/0011664 A1 | 1/2016 | Silvanto et al. | |

FOREIGN PATENT DOCUMENTS

| | | |
|---|---|---|
| JP | 2010537279 | 12/2010 |
| JP | 2010540320 | 12/2010 |
| KR | 20050033909 | 4/2005 |
| TW | 2010035805 | 10/2010 |
| WO | WO02/073587 | 9/2002 |
| WO | WO2006/091494 | 8/2006 |
| WO | WO2007/114631 | 10/2007 |
| WO | WO2009/038862 | 3/2009 |
| WO | WO2014/066516 | 5/2014 |

OTHER PUBLICATIONS

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

* cited by examiner

HAPTIC MODULES WITH INDEPENDENTLY CONTROLLABLE VERTICAL AND HORIZONTAL MASS MOVEMENTS

TECHNICAL FIELD

The present disclosure relates generally to methods and apparatuses for providing haptic effects and haptic feedback, and more particularly relates to methods and apparatus for providing a rapid haptic effect.

BACKGROUND

Haptic effects or haptic feedback refers to touch or tactile sensations, such as a vibration or other physical sensations, of an electronic device which can be used to provide feedback or notifications to a user of the electronic device.

Many conventional electronic devices provide haptic effects utilizing vibration inducing devices, such as an electric motor connected to an eccentric unbalanced weight or mass which causes the electronic device to vibrate or buzz based on rotary motion of the weight.

As recognized by the present inventor, what is needed are differing types of haptic devices to provide additional types of haptic effects to a user.

SUMMARY

According to one broad aspect of one embodiment, disclosed herein is an electronic device that may include a first haptic module for creating a first haptic effect, the first haptic module having a first weight member that selectively moves in a substantially vertical orientation relative to the first haptic module; a second haptic module for creating a second haptic effect, the second haptic module having a second weight member that selectively moves in a substantially horizontal orientation relative to the second haptic module; and a processor for controlling the first and second haptic modules.

In one example, the first haptic module may include a frame member, a weight member positioned within the frame member, and an actuator wire coupled with the weight member and the frame member. In one example, the actuator wire may include a Nitinol material or other shape memory alloy, and when the actuator wire receives an electrical current, the actuator wire shortens, thereby vertically moving the first weight member from a first position to a second position and creating the first haptic effect. When the electrical current decreases or decays, the actuator wire returns to its original length and the first weight member returns to the first position.

In one example, the second haptic module may include a frame member, a weight member positioned within the frame member, and an actuator wire coupled with the weight member and the frame member. In one example, the actuator wire may include a Nitinol material or other shape memory alloy, and when the actuator wire receives an electrical current, the actuator wire shortens, thereby horizontally moving the second weight member from a first position to a second position and creating the second haptic effect. When the electrical current decreases or decays, the actuator wire returns to its original length and the second weight member returns to the first position.

In one example, the processor selectively activates either the first haptic module or the second haptic module based on one or more events or conditions, such as the current orientation or position of the electronic device.

According to another broad aspect of another embodiment, disclosed herein is an electronic device that may include a haptic module for creating a haptic effect, the haptic module having frame, a weight member positioned within the frame, and an actuator wire coupled between the weight member and the frame, wherein when the actuator wire receives an electrical signal, the actuator wire shortens thereby moving the weight member within the frame to create the haptic effect; and a processor for controlling the haptic module.

In one example, the haptic module is configured so that the weight member moves in a substantially vertical orientation relative to the frame, and in another example, the haptic module is configured so that the weight member moves in a substantially horizontal orientation relative to the frame. The actuator wire may include a Nitinol material or other shape memory alloy, and the processor may selectively activate the haptic module based on one or more events or conditions such as the orientation or position of the electronic device.

According to another broad aspect of another embodiment, disclosed herein is a method of creating a haptic feedback effect in an electronic device. In one example, the method may include providing a first haptic module configured to move a first weight member in a substantially vertical orientation relative to the first haptic module to create a first haptic feedback effect; providing a second haptic module configured to move a second weight member in a substantially horizontal orientation relative to the second haptic module to create a second haptic feedback effect; determining an orientation of the electronic device; and responsive to determining operation, activating either the first haptic module to create the first haptic feedback effect or activating the second haptic module to create the second haptic feedback effect.

In one example, if the determining operation determines that the orientation of the electronic device is substantially horizontal, then the activation operation may activate the first haptic module to create the first haptic feedback effect. In another example, if the determining operation determines that the orientation of the electronic device is substantially vertical, then the activation operation may activate the second haptic module to create the second haptic feedback effect.

Other embodiments are described herein. The features, utilities and advantages of various embodiments of the disclosure will be apparent from the following more particular description of embodiments as illustrated in the accompanying drawings.

DETAILED DESCRIPTION

Figure 1:
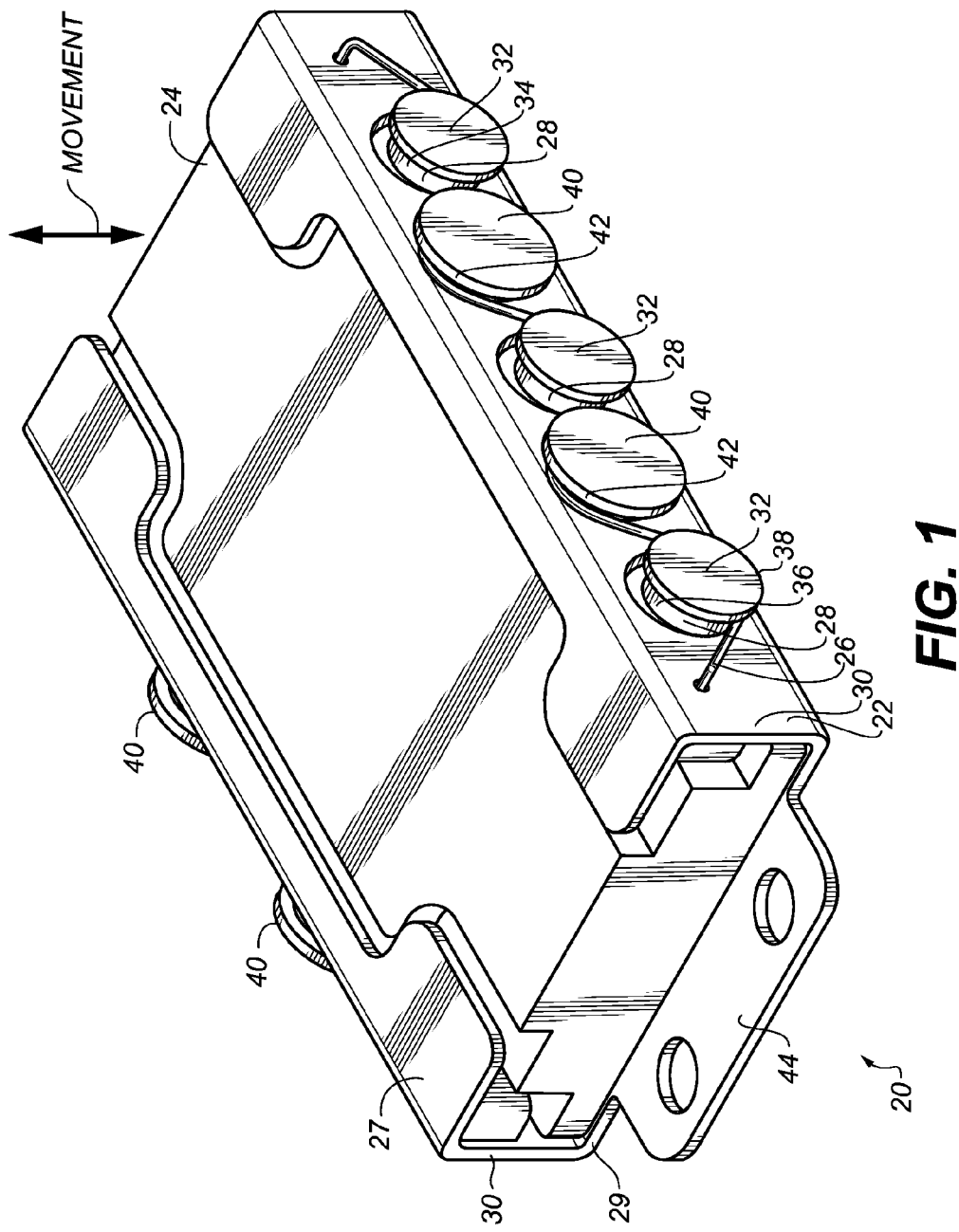
FIG. 1 illustrates an example of a haptic module creating a haptic effect based on vertical motion of a mass/weight member, in accordance with one embodiment of the present disclosure.

Described herein are various embodiments of haptic modules which can create differing haptic effects within an electronic device 18, such as, but not limited to, portable electronic devices, mobile phones, smart phones, tablet computers, music and multi-media players, wearable devices, wearable health assistants, video game controllers, and other handheld, wearable or portable devices. The haptic effects may be selectively created based on vertical and/or horizontal movements of a mass or weight member. In this manner, different haptic effects can be utilized by an electronic device depending on differing situations, factors, or events, such as a current orientation or motion of the electronic device. Various embodiments are described in the present disclosure.

In one example, a haptic module 20 (FIG. 1) can create haptic effects based on vertical movements of a mass/weight member 24 within the haptic module 20, while in another example, haptic module 50 (FIG. 2) can create haptic effects based on horizontal/lateral movements of a mass/weight member 54 within the haptic module 50. In one embodiment, an electronic device 18 (see FIG. 6) is provided with both haptic modules 20 and 50 so that electronic device 18 can provide differing haptic effects in response to different situations, scenarios or conditions. In another embodiment, an electronic device 18 may be provided with either haptic module 20 or haptic module 50, as desired.

As described herein, a haptic effect is created when a haptic module (such as module 20 or module 50) within a portable device 18 rapidly moves one or more mass elements or weight members (such as 24 or 54), so as to temporarily physically move or jolt the portable device 18. When a haptic effect occurs, a user holding, manipulating or otherwise in contact with the portable device 18 experiences or feels the temporary movement of the portable device 18. Haptic effects as described herein can be provided within a portable device 18 in addition to or as a complement to traditional tactile feedback effects such as vibrational effects. In portable electronic devices 18, especially very small ones, a haptic effect allows feedback or notifications to be provided to the user of the electronic device 18.

In accordance with some embodiments of the present disclosure, data from a conventional accelerometer (e.g., 142 in FIG. 6) that is included in a portable electronic device 18 can be utilized to determine the orientation of the electronic device 18. When the electronic device 18 is in a vertical orientation (such as within a user's pocket), in one example, a haptic effect based upon lateral movement created by haptic module 50 (FIG. 2) may be desired. In another example, when the electronic device 18 is in a horizontal orientation, such as when device 18 is resting on a table or a wearable electronic device is in a substantially horizontal orientation, a haptic effect based upon vertical movement created by haptic module 20 may be desired.

FIG. 1 illustrates an example of a haptic module 20, in accordance with one embodiment of the present disclosure, which can be used with or incorporated into a portable electronic device 18. In this example, haptic module 20 includes a frame member 22, a weight member or mass 24 (which may include tungsten or other dense material) positioned within frame member 22, and an actuator wire 26 (e.g., a shape memory alloy such as a Nitinol wire) connected between portions of frame member 22 and weight member 24 for controlling movement of weight member 24 within the frame member 22 in order to create haptic effects or provide haptic feedback in electronic device 18 through haptic module 20. As described herein, actuator wire 26 rapidly changes shape and/or length under control of electronic device 18, and in response, weight member 24 moves substantially upwardly or downwardly (i.e., linearly) relative to frame member 22, thereby creating a haptic effect, movement or action such as but not limited to a tap, pop, jolt or other movement. The distance traveled by the weight member 24 within the frame member 22 can be configured or tuned in a particular implementation of a haptic module 20 to achieve a desired haptic effect.

The haptic module 20 of FIG. 1 is generally planar in one example, which makes it suitable for use within a portable electronic device 18. The frame member 22 can be configured to partially or completely encase or surround weight member 24. In one example, frame member 22 prevents or restricts horizontal or lateral movement of weight member 24 with frame member 22, while allowing a defined amount vertical movement of weight member 24 within frame member 22. Frame member 22 may include upper or top portions 27, and bottom portion 29, in one example.

The frame member 22, in one example, can have one or more openings 28 along one or more sides or surfaces 30 of the frame member 22. In the example of FIG. 1, openings 28 are positioned along the sides 30 of frame member 22, but in another example openings 28 could also be positioned along the ends of frame member 22.

Weight member 24, in one example, may include one or more extensions, nodes, tabs or protrusions 32 extending outwardly from one or more sides or services of weight member 24. In the example of FIG. 1, the protrusions 32 are generally cylindrically shaped, and may include or define a channel 34 for receiving actuator wire 26. For instance, protrusions 32 may include a cylindrical shaft portion 36 having a diameter, and a cylindrical cap portion 38 connected to the distal end of shaft portion 36, wherein the cylindrical portion 38 has a diameter larger than the diameter of the cylindrical shaft portion 36.

The openings 28 of frame member 22 are adapted to receive the one or more extensions/protrusions 32 of weight member 24. In one example, openings 28 define a length that may have a generally vertical orientation, such as an oval, rectangle, or other shape which extends vertically along a side 30 of frame member 22. In this manner, openings 28 support and guide movement of protrusions 32 of the weight member 24 within the openings 28, for instance between various substantially vertical positions such as a first vertical position and a second vertical position. In another example, openings 28 can be angled in actuate or obtuse angular orientations relative to the frame member 22, so as to create differing movement patterns of the weight member 24 relative to the frame member 22, if desired.

Frame member 22 may also include one or more posts or nodes 40 extending outwardly from sides or surfaces 30 of the frame member. The posts 40 may be positioned along the same sides or services as the protrusions 32 of weight member 24, and the posts 40 may include channels 42 to guide actuator wire 26 along posts 40. Frame member 22 may also include a tab or extension 44 or other structure so that frame member 22 can be connected with a portable electronic device 18.

In this example of FIG. 1, there are, along one side of frame member 22 and weight member 24, three protrusions 32 and two posts 40 in an alternating arrangement. Protrusions 32 and posts 40 can be provided with a non-conductive coating in one example, so as to electrically insulate them from the current/voltage or other signals applied to or flowing through actuator wire 26.

To create vertical movement of weight 24 within the frame member 22, actuator wire 26 is routed under a first protrusion 32 of weight member 24, over the adjacent post 40 of frame member 22, under the second protrusion 32 of weight member 24, over the second post 40 of frame member 22, and under the third protrusion 32 of weight member 24. The actuator wire may be secured to the frame member at each of its ends.

In one example, in a first state (such as a default state), the actuator wire 26 is in its normal state defining a first length. This default, first state can exist, for instance, when no voltage, current, heat or other energy or signal is applied to the actuator wire 26. In this example, the weight 24 in the first state is in its lower vertical position relative to frame member 22.

In a second state, when an excitation signal (such as current, voltage or other signal or energy) is applied to the actuator wire 26, the wire heats up, contracts and shortens in length, which rapidly moves the weight member 24 upwardly, which creates a haptic effect of a tap, pop, jolt or other movement of the haptic module 20 and of the electronic device 18. In the example of FIG. 1, since the actuator wire 26 is fixedly attached at its ends to frame member 22 and since the wire 26 is routed around posts 40 and routed under protrusions 32, the shortened length of wire 26 applies an upward force on protrusions 32 which has the effect of rapidly moving weight member 24 upwardly to the second vertical position (which in one example is higher or above the first vertical position of the first state) which creates a haptic effect in the haptic module 20 and electronic device 18.

When the excitation signal is then removed or discharges, the wire 26 restores to its default length, which thereby decreases and/or removes the upward force on protrusions 32 which has the effect of allowing weight member 24 to move downwardly, for instance back to its first position or default position.

In one example, a second set of openings 28, protrusions 32 and posts 40 are provided on a second side or surface (for instance, an opposing side) of the frame member 22 and weight member 24. A second actuator wire (similar to wire 26) can be securely connected at its ends to the second side or surface of frame member 22, and routed through the second set of openings 28, protrusions 32 and posts 40. In this example, when both actuator wires are activated simultaneously (i.e., a current, voltage, or other signals or energies are applied simultaneously to both wires 26), the upward force applied to the weight member 24 is larger (e.g., double) than if a single wire 26 is used, which can also have the effect of increasing the rate at which the weight member 24 moves upwardly within the frame member 22.

Figure 2:
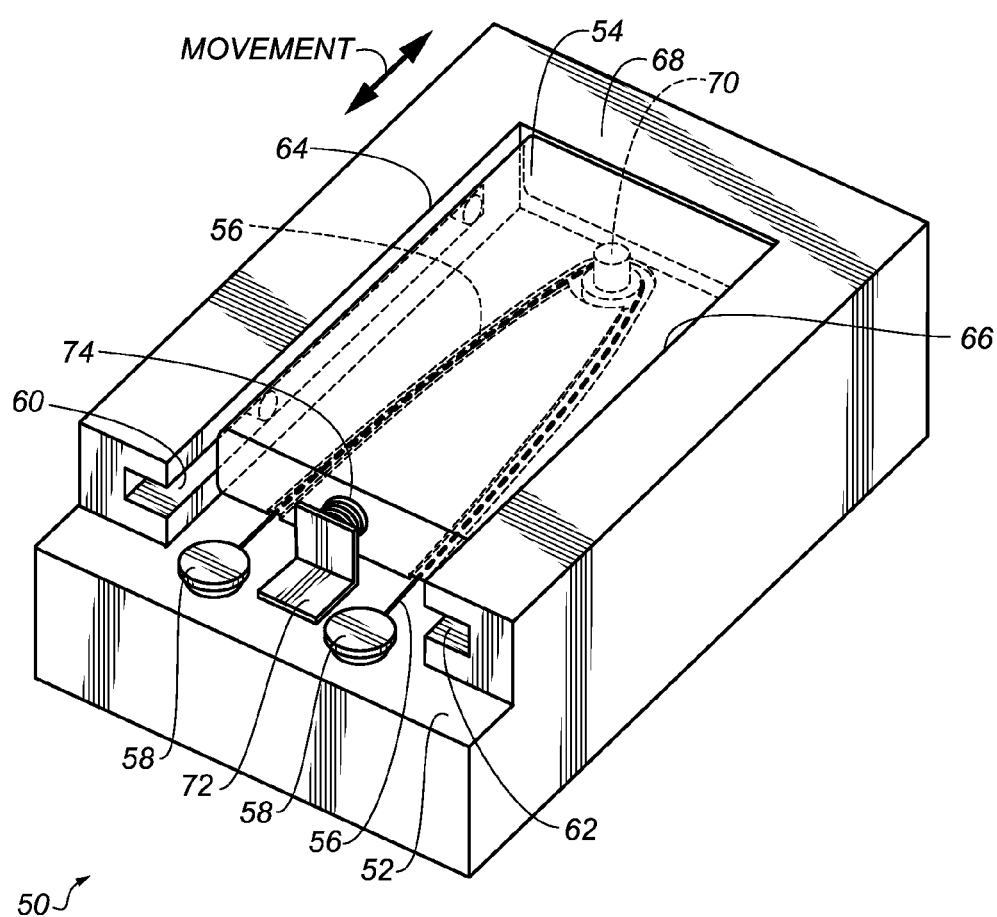
FIG. 2 illustrates an example of a haptic module creating a haptic effect based on horizontal motion of a mass/weight member, in accordance with one embodiment of the present disclosure.

FIG. 2 illustrates another example of a haptic module 50 for use in an electronic device 18, in accordance with one embodiment of the present disclosure.

In this example, haptic module 50 includes a frame member 52, a weight member 54 positioned within frame member 52, and an actuator wire 56 (e.g., a shape memory alloy such as a Nitinol wire) connected between weight member or mass 54 (which may include tungsten or other dense material) and frame member 52 for controlling movement of weight member 54 within the frame member 52 in order to create haptic effects or provide haptic feedback in electronic device 18 through haptic module 50. As described herein, actuator wire 56 rapidly changes shape and/or length under control of the electronic device 18, and in response, weight member 54 moves laterally within frame member 52, thereby creating a haptic effect, movement or action such as but not limited to a tap, pop, jolt or other movement. The distance traveled by the weight member 54 within the frame member 52 can be configured or tuned in a particular implementation of haptic module 50 to achieve a desired haptic effect.

The haptic module 50 of FIG. 2 is generally planar in one example, which makes it suitable for use within a portable electronic device 18.

Frame member 52 may include one or more wire securing members 58 securing the ends of actuator wire 56 to frame member 52. Frame member 52 may also include lateral guide slots 60, 62 along sides 64, 66 that, along with end member 68, provide or define an area within frame member 52 wherein weight member 54 can laterally move from at least a first position to a second position in response to a change in the length and/or shape of actuator wire 56.

Weight member 54 may include a wire attachment pin 70 receiving or coupling with a portion of actuator wire 56, or in another embodiment, actuator wire 56 may be attached to or secured to a portion of weight member 54 depending upon the particular implementation. Pin 70 can be provided with a non-conductive coating in one example, so as to electrically insulate pin 70 from the current/voltage or other signals applied to or flowing through actuator wire 26.

Frame member 52 may also include a stop member (e.g., L-shaped tab) 72 with the return spring 74 configured to be in contact with one end of the weight member 54. In one example, stop member 72 and return spring 74 are positioned on an end opposing the end member 68 of frame member 52.

The frame member 52 can be configured to partially or completely encase or surround weight member 54. In one example, frame member 52 prevents or restricts vertical movement of weight member 54 with frame member 52, while allowing a defined amount lateral, horizontal, or linear movement of weight member 54 within frame member 52.

In another example, the guide slots 60, 62 of frame member 52 can be angled in acute or obtuse angular orientations relative to the frame member 52, so as to create differing movement patterns of the weight member 54 relative to the frame member 52, if desired.

Frame member 52 may also include structures so that frame member 52 can be connected with or secured within a portable electronic device 18.

In this example of FIG. 2, to create lateral/horizontal movement of weight 54 within the frame member 52, actuator wire 56 is routed around or connected with a wire attachment pin 70 (or other attachment structure depending on the implementation) of the weight member 54, in one example. The actuator wire 56 may be secured to the frame member 52 at each of its ends. The return spring 74 is positioned between an end of the weight member 54 and the stop member 72, such that the return spring 74 exerts a force upon the weight member to bias the position of weight member 54 towards end member 68 of frame member 52.

In one example, in a first state (such as a default state), the actuator wire 56 is in its normal state defining a first length. This default, first state can exist, for instance, when no voltage, current, heat or other energy or signal is applied to the actuator wire 56. In this example, the weight member 54 in the first state is in its horizontal position closest to end member 68 within frame member 52, due to the spring force of return spring 74 onto weight member 54. In this example of a first position/first state, the return spring 74 is generally uncompressed or slightly compressed (especially when compared with the second state described below).

In a second state, when an excitation signal (such as current, voltage or other signal or energy) is applied to the actuator wire 56, the wire 56 heats up, contracts and shortens in length, which rapidly moves the weight member 54 laterally toward the stop member 72 and compresses the return spring 74, and such rapid lateral movement of the weight member 54 creates a haptic effect of a tap, pop, jolt or other movement of the haptic module 50 and of the electronic device 18. In the example of FIG. 2, since the actuator wire 56 is fixedly attached at its ends to frame member 52 and since the wire 26 is also routed around or connected with wire attachment pin 70 of weight member 54, the shortened length of wire 56 applies a lateral force on wire attachment pin 70 which in one example overcomes the spring force of return spring 74, and therefore has the effect of rapidly moving weight member 54 laterally to the second horizontal position (which in one example is closer to the stop member 72 than when in the first position or first state) which creates the haptic effect in the haptic module 50 and electronic device 18.

When wire 56 has the excitation signal removed or discharged, the wire 56 restores or returns to its default length, which thereby decreases and/or removes the lateral force on wire attachment pin 70 on the weight member 54, at which point the spring force of return spring 74 moves weight member 54 laterally back towards the first position or default (i.e., away from stop member 72 and towards end member 68 of frame member 52).

In one example, actuator wires 26, 56 may be approximately 15 mm in length or other lengths as desired, and when activated via the application of an electrical current, actuator wires 26, 56 may shrink in length on the order of approximately 2% to 4% or more. In one example, a capacitance of between approximately 300 to 400 µFarads (e.g., 330 µFarads), with approximately 10 to 15 volts applied thereto, can be discharged into wires 26, 56 in order to change the wire's length.

Figure 3:
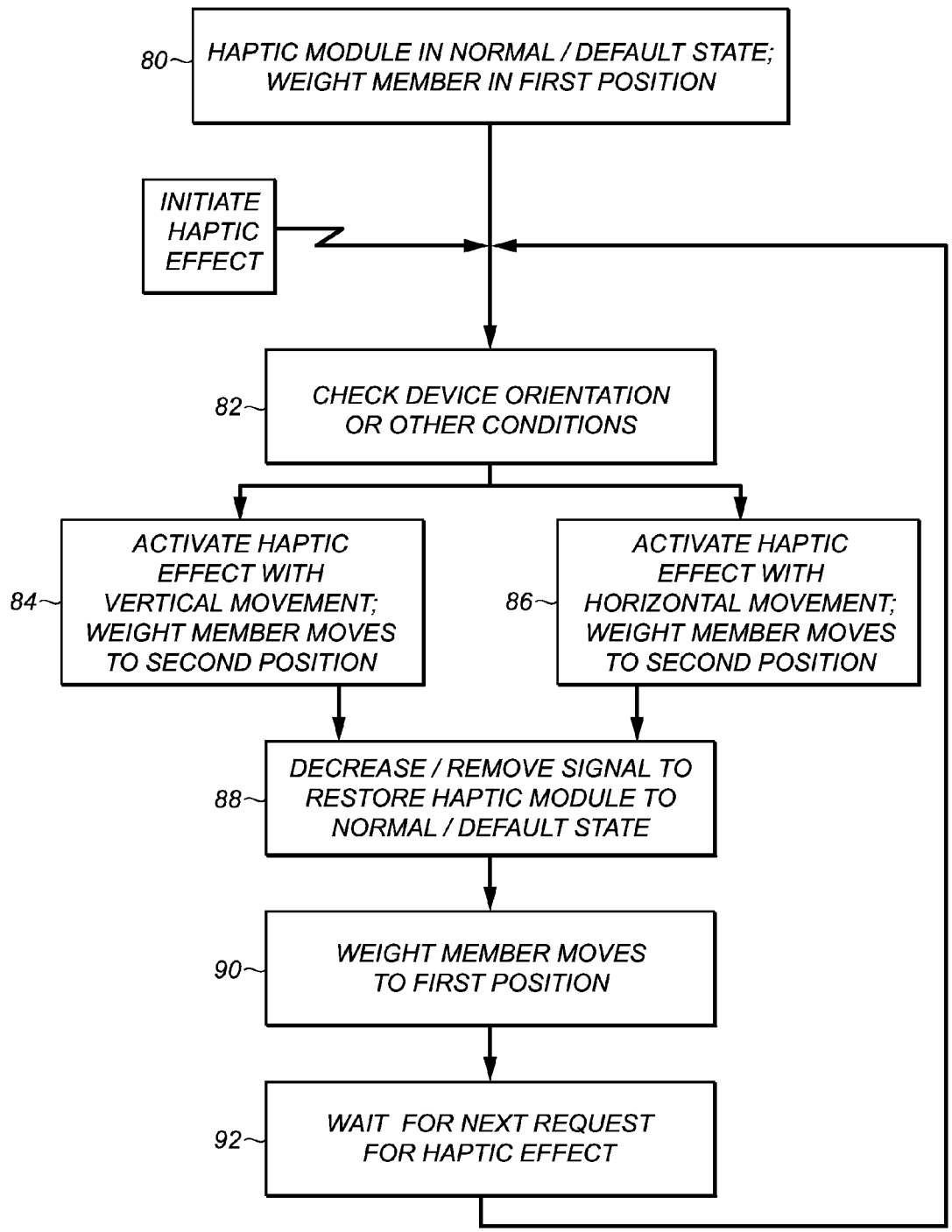
FIG. 3 illustrates an example of a process for activating a haptic effect, in accordance with one embodiment of the present disclosure.

FIG. 3 illustrates an example of a method for creating haptic effects in an electronic device based upon horizontal or vertical movement of a weight member, in accordance with one embodiment of the present disclosure. At operation 80, a haptic module is in a normal or default state, wherein the weight member is in a first position. Upon detection of a condition within an electronic device which warrants the initiation of a haptic effect, control is passed to operation 82.

At operation 82, the electronic device's orientation and/or movement is determined. In one example, operation 82 examines data from the electronic device's accelerometer(s) (or gyroscopes if present) in order to determine whether the device is currently substantially vertically oriented or substantially horizontally oriented.

In one example, if the electronic device is substantially horizontally oriented, it may be desired to provide haptic feedback based on vertical movements of the weight member within a haptic module, and in such a situation control is passed to operation 84. Conversely, if the electronic device is substantially vertically oriented, it may be desired to provide haptic feedback based on lateral movements of the weight member within a haptic module, and in such a situation control is passed to operation 86. Other conditions, variables, events or factors may be utilized to determine whether to pass control either to operation 84 for creation of haptic effects based on vertical movement of a weight member, or to operation 86 for creation of haptic effects based on horizontal/lateral movement of a weight member.

If control is passed to operation 84, at operation 84 vertical movement of a weight member of a haptic module is activated, in one example by discharging a capacitor into an actuating wire of a haptic module to create rapid vertical movement of the weight member from the first position (of operation 80) to a second position, which creates a haptic effect.

If control is passed to operation 86, at operation 86 horizontal/lateral movement of a weight member of a haptic module is activated, in one example by discharging a capacitor into an actuating wire of a haptic module to create rapid lateral movement of the weight member from the first position (of operation 80) to a second position, which creates a haptic effect.

At operation 88, the signal applied by operations 84 or 86 is removed, decays or decreases so as to restore the haptic module to its normal/default/first state. At operation 90, the weight member with the haptic modules moves or returns back to its first position.

At operation 92, the process may wait until a new request for a haptic effect is received, upon which control may be returned to operation 82 in order to repeat operations 82-92.

As described herein, haptic feedback or effects can be created and provided to the user of electronic device 18 based upon horizontal/lateral movements of weight member 54 in certain situations, while in other situations, haptic feedback or effects can be created and provided to the user of electronic device 18 based upon vertical movement of weight member 24.

In addition, the type, frequency, amplitude or duration of haptic feedback created by an electronic device 18 can be dynamically changed or adjusted depending upon the orientation, position, movement, or other events of electronic device 18. For instance, if it is desired to reduce or avoid the possible annoyance of an electronic device 18 that is resting on a table (detected such as through accelerometer data), the haptic feedback or haptic effect provided by electronic device 18 (for instance when an incoming phone call is received) could be dynamically adjusted to be for example one or more taps created by haptic modules 20 or 50. This is in contrast with some conventional electronic devices which utilize large and extended vibrations of the electronic device to notify users of events such as incoming phone calls.

In another example, an electronic device 18 can be configured to test the level of noise that would be generated by haptic effects such as vibrations. In one example, an electronic device 18 may emit a test haptic pulse, and a microphone (e.g., 140 in FIG. 6) of the electronic device 18 checks to a level of noise generated by the test haptic pulse. For instance, when an electronic device 18 is resting on a steel table, a large amount of noise may be generated by the test haptic pulse, in contrast with when an electronic device 18 is resting on a softer surface or pillow which would not typically generate large amounts of resonance noise. If the electronic device 18 determines that the test haptic pulse generates an amount of noise above a desired threshold, then the electronic device 18 could dynamically change the type, frequency, amplitude or duration of the haptic feedback utilized (for instance to indicate an incoming call).

Figure 4:
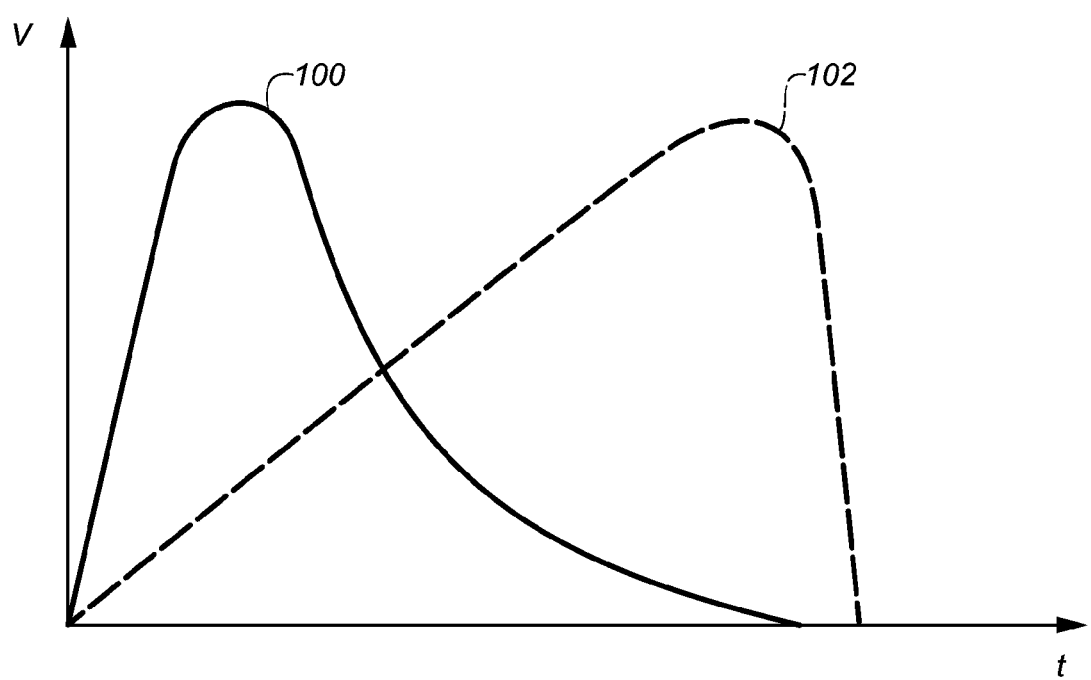
FIG. 4 illustrates an example of a graph showing movement velocities of a weight member/mass of a haptic module, in accordance with some embodiments of the present disclosure.

FIGS. 4-5 illustrate examples of tuning a response of a haptic module, in accordance with one embodiment of the present disclosure. FIG. 4 illustrates a velocity curve 100 for movements of a weight within haptic device based on a changing shape of an actuator wire in response to capacitor discharge, as well as a desired gradual ramp-up velocity curve 102. Curve 100 shows that a haptic device may have a very short range of motion of the weight movement, along with a very quick ramp up speed where peak velocity instantaneously achieved resulting in a very abrupt "tick" in the haptic module. FIG. 5 illustrates an example of a tunable haptic module 110, in accordance with an embodiment of the present disclosure.

Figure 5A:
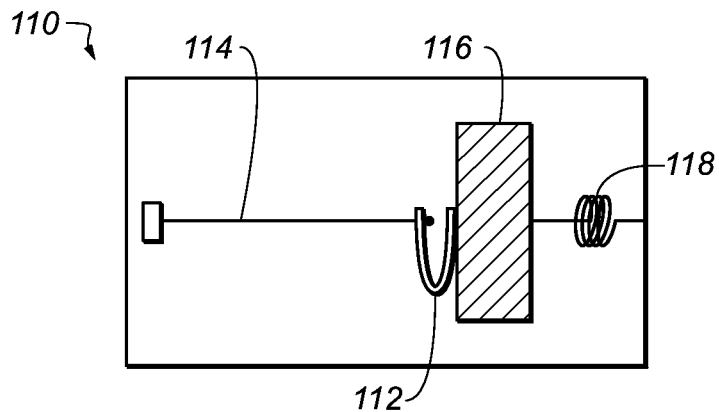
FIGS. 5A-5C illustrate examples of a block diagram of a haptic module configured to be tuned to adjust the movement velocities of the weight member/mass, in accordance with one embodiment of the present disclosure.
Figure 5B:
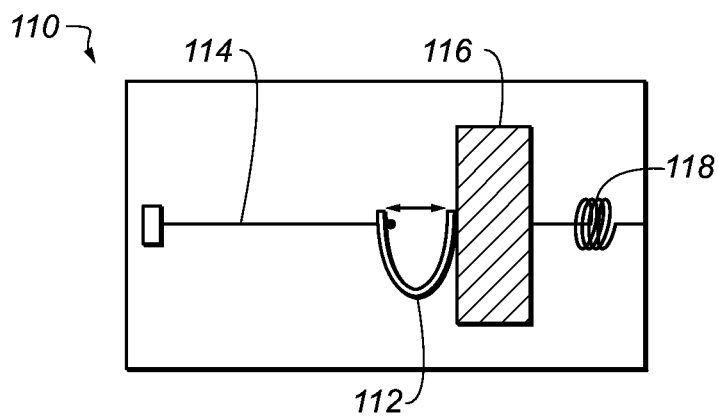
Figure 5C:
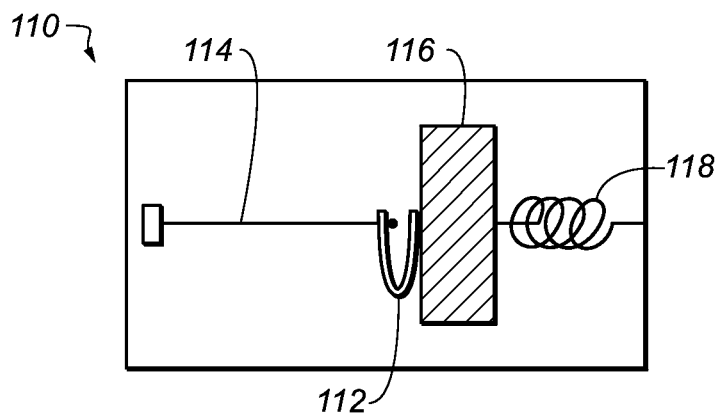

In FIG. 5A, a leaf spring 112 is coupled between an actuator wire 114 and one end of the weight member/mass 116 in its initial first position, while the other end of the weight member/mass 116 is coupled with a return spring 118 that is fixed at its opposing end. When current is applied to the actuator wire 114 and the wire 114 shortens/shrinks, as shown in FIG. 5B the leaf spring 112 is extended which generates a pull force within the leaf spring 112 which begins to pull/move the weight member/mass 116 towards its second position. In FIG. 5C, the mass 116 gradually increases velocity to its peak, at which point the mass 116 has moved to its second position, wherein the leaf spring 112 is returned to its initial state and the return spring 118 is extended. As the actuator wire 114 cools and returns (lengthens) to its original length, the return spring 118 shortens and the weight member/mass 116 returns to its first position as shown in FIG. 5A.

In this example of the present disclosure, the speed of the wire 114 shrinkage is decoupled or buffered from the motion of the weight member/mass 116 by using the leaf spring 112, wherein once loaded, the leaf spring 112 can be used to pull the weight member/mass 116 at a tunable or selectable speed. A return spring 118 (e.g., a weak return spring) can be coupled with the weight member/mass 116 to give a gradual increase in velocity; or, if desired, a stiff return spring 118 would provide a sharper increase in velocity.

Various embodiments may include alternative structures or arrangements. For example, a controlled electrical discharge from a capacitor (other voltage source) may be used to slowly heat the wire 114, rather than providing an instantaneous or near-instantaneous shrinkage of the wire. As another example, a spring may be placed at only one side of the mass. As still another example, a spring may be placed within the length of the wire 114, such that it splits the wire 114 into two pieces, each connected to a different side of the spring.

Figure 6:
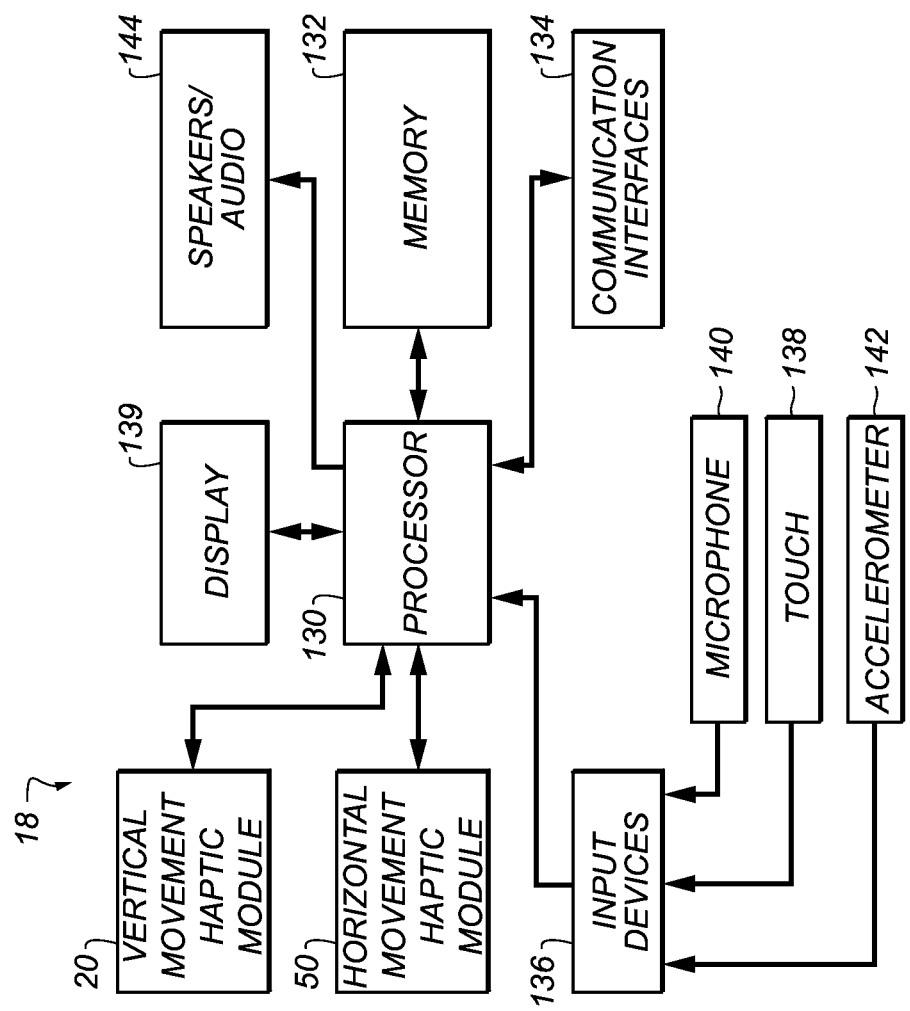
FIG. 6 illustrates a block diagram of an example of an electronic device having one or more haptic modules, in accordance with one embodiment of the present disclosure.

FIG. 6 illustrates a block diagram of a non-limiting example of an electronic device 18, in accordance with one embodiment of the present disclosure. It is understood that electronic devices 18 could be formed using structures or architectures different than that as shown in FIG. 6.

Referring to FIG. 6, electronic device 18 may include a processor 130, memory 132 (which may include ROM and RAM for program memory and data stores), and communications interfaces 134 (such as but not limited to wireless interfaces, Bluetooth interfaces, USB interfaces, Wi-Fi interfaces, TCP/IP interfaces, network communications interfaces, or any conventional communication interfaces).

Electronic device 18 may include various input devices 136, such as but not limited to, touch inputs 138 (which may be part of or separate from touchscreen 139), audio/microphone input 140, data from accelerometer(s) 142 and other inputs such as buttons, keypads, switches, sliders or any other conventional input. Speaker or audio outputs 144 may also be provided.

In accordance with some embodiments of the present disclosure, electronic device 18 may include one or more module(s) 20, 50 for generating haptic feedback. Module(s) 20, 50 may include one or more of the features, functions or processes disclosed herein; and module(s) 20, 50 may be implemented in various manners, such as but not limited to, as hardware devices, specialized integrated circuits, logic, computer program products, code modules operating on processor 130 or device 18, or in any combination thereof.

In one example, electronic device 18 may be configured in the form of a wearable health assistant that provides health-related information (whether real-time or not) to the user, authorized third parties, and/or an associated monitoring device. Device 18 may be configured to provide health-related information or data such as but not limited to heart rate data, blood pressure data, temperature data, oxygen level data, diet/nutrition information, medical reminders, health-related tips or information, or other health-related data. The associated monitoring device may be, for example, a tablet computing device, phone, personal digital assistant, computer, and so on.

Depending on the particular implementation and the positioning of haptic modules 20, 50 within electronic device 18, various haptic effects are possible. For instance and in one non-limiting example, if haptic modules 20, 50 are placed or integrated in a co-planar relationship with a display 139 (which may be a touchscreen) of an electronic device 18, haptic module 20 could be configured to create haptic effects that include movements perpendicular to or normal to the plane of the touchscreen 139 of electronic device 18, while haptic module 50 could be configured to create haptic effects that include movements which are generally in the plane of touchscreen 139 of electronic device 18. Other orientations of the haptic modules and associated haptic movements are possible.

While embodiments of the present disclosure have been described with respect to haptic module 20 and haptic module 50 and their selective activation, it is understood that additional or multiple haptic modules can be incorporated into device 18, and differing haptic effects can be created based on simultaneous, combined, overlapping, repeated, sequential or alternating activations of two or more of the haptic modules, or any combinations thereof.

Hence, it can be seen that various embodiments of the present disclosure provide for creating haptic effects and haptic feedback for use in portable electronic devices based on vertical and/or horizontal movements of a mass or weight member.

While the methods disclosed herein have been described and shown with reference to particular operations performed in a particular order, it will be understood that these operations may be combined, sub-divided, or re-ordered to form equivalent methods without departing from the teachings of the embodiments herein. Accordingly, unless specifically indicated herein, the order and grouping of the operations is not a limitation of the disclosed embodiments.

In this description, references to "one embodiment" or "an embodiment," or to "one example" or "an example" mean that the feature being referred to is, or may be, included in at least one embodiment or example. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, embodiments within the scope of the disclosure may include a variety of combinations and/or integrations of the embodiments and examples described herein, as well as further embodiments and examples as defined within the scope of all claims based on this disclosure, as well as all legal equivalents of such claims.

It should be appreciated that in the foregoing description of exemplary embodiments, various features of the embodiments disclosed herein are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiments require more features than are expressly recited in each claim. Rather, inventive aspects lie in less than all features of a single foregoing disclosed embodiment, and each embodiment described herein may contain more than one inventive feature.

While various embodiments have been particularly shown and described herein, it will be understood by those skilled in the art that various other changes in the form and details may be made without departing from the spirit and scope of the disclosure.

I claim:

1. An electronic device, comprising:
   a planar surface;
   a first haptic module for creating a first haptic effect, the first haptic module having a first weight member that selectively moves in a substantially perpendicular direction relative to the planar surface;
   a second haptic module for creating a second haptic effect, the second haptic module having a second weight member that selectively moves in a substantially parallel direction relative to the planar surface; and
   a processor for controlling the first and second haptic modules.

2. The electronic device of claim 1, wherein the first haptic module includes a frame member, a weight member positioned within the frame member, and an actuator wire coupled with the weight member and the frame member.

3. The electronic device of claim 2, wherein the actuator wire is formed from a shape memory alloy.

4. The electronic device of claim 2, wherein when the actuator wire receives an electrical current, the actuator wire shortens, thereby moving the first weight member in the perpendicular direction from a first position to a second position.

5. The electronic device of claim 4, wherein when the electrical current decreases, the actuator wire returns to an original length and the first weight member moves in the perpendicular direction to return to the first position.

6. The electronic device of claim 1, wherein the second haptic module includes a frame member, a weight member positioned within the frame member, and an actuator wire coupled with the weight member and the frame member, wherein the frame member defines one or more slots that guide movement of the weight member within the frame member.

7. The electronic device of claim 6, wherein the weight member has a pin and the actuator wire is routed around a portion of the pin.

8. The electronic device of claim 6, wherein when the actuator wire receives an electrical current, the actuator wire shortens, thereby moving the second weight member in the parallel direction from a first position to a second position.

9. The electronic device of claim 8, wherein when the electrical current decreases, the actuator wire returns to an original length and the second weight member moves in the parallel direction to return to the first position.

10. The electronic device of claim 1, wherein the processor selectively activates either the first haptic module or the second haptic module based on one or more events.

11. The electronic device of claim 10, wherein the one or more events include an orientation of the electronic device.

12. An electronic device, comprising:
    a haptic module for creating a haptic effect, the haptic module having a frame, a weight member positioned within the frame, and an actuator wire coupled between the weight member and the frame, wherein when the actuator wire receives an electrical signal, the actuator wire shortens thereby moving the weight member within the frame to create the haptic effect; and
    a processor for controlling the haptic module.

13. The electronic device of claim 12, wherein the haptic module is configured so that the weight member moves in a substantially vertical orientation relative to the frame.

14. The electronic device of claim 12, wherein the haptic module is configured so that the weight member moves in a substantially horizontal orientation relative to the frame.

15. The electronic device of claim 12, wherein the actuator wire is formed from a shape memory alloy.

16. The electronic device of claim 12, wherein the processor selectively activates the haptic module based on one or more events.

17. The electronic device of claim 16, wherein the one or more events include an orientation of the electronic device.

18. A method of creating a haptic feedback effect in an electronic device, comprising:
    determining an orientation of the electronic device; and
    responsive to the determining operation, activating either a first haptic module to create a first haptic feedback effect or activating a second haptic module to create a second haptic feedback effect; wherein
    the first haptic module is configured to move a first weight member in a substantially perpendicular direction relative to a planar surface of the electronic device to create the first haptic feedback effect; and
    the second haptic module is configured to move a second weight member in a substantially parallel direction relative to the planar surface of the electronic device to create the second haptic feedback effect.

19. The method of claim 18, wherein if the determining operation determines that the orientation of the electronic device is substantially horizontal, then the activation operation activates the first haptic module to create the first haptic feedback effect.

20. The method of claim 18, wherein if the determining operation determines that the orientation of the electronic device is substantially vertical, then the activation operation activates the second haptic module to create the second haptic feedback effect.

21. The method of claim 18, wherein the planar surface is defined by a display screen.

22. The electronic device of claim 1, wherein the planar surface is defined by a display screen.

* * * * *